United States Patent
Pryadkin et al.

(10) Patent No.: US 8,330,963 B2
(45) Date of Patent: Dec. 11, 2012

(54) OPTICAL METHOD FOR PRECISE THREE-DIMENSIONAL POSITION MEASUREMENT

(76) Inventors: Sergiy Pryadkin, Troy, MI (US); Dmitri Simonian, Sunnyvale, CA (US)

( * ) Notice: Subject to any disclaimer, the term of this patent is extended or adjusted under 35 U.S.C. 154(b) by 0 days.

(21) Appl. No.: 13/269,698

(22) Filed: Oct. 10, 2011

(65) Prior Publication Data

US 2012/0113433 A1    May 10, 2012

Related U.S. Application Data

(62) Division of application No. 12/264,268, filed on Nov. 4, 2008, now Pat. No. 8,063,383.

(51) Int. Cl.
*G01B 11/02* (2006.01)
(52) U.S. Cl. .......... 356/500; 356/482
(58) Field of Classification Search ........... 356/72, 356/622, 482; 324/716
See application file for complete search history.

(56) References Cited

U.S. PATENT DOCUMENTS

| | | | |
|---|---|---|---|
| 4,714,339 A * | 12/1987 | Lau et al. ............ | 356/4.09 |
| 5,359,415 A * | 10/1994 | Tabarelli ............ | 356/482 |
| 5,360,974 A | 11/1994 | Hammond et al. | |
| 5,450,989 A | 9/1995 | Gilroy | |
| 5,455,420 A | 10/1995 | Ho et al. | |
| 5,510,615 A | 4/1996 | Ho et al. | |
| 5,530,253 A | 6/1996 | Nishioka et al. | |
| 5,530,549 A * | 6/1996 | Brown ............ | 356/622 |
| 5,675,154 A | 10/1997 | Lindsay et al. | |
| 5,760,396 A | 6/1998 | Lindsay et al. | |
| 6,278,113 B1 | 8/2001 | Murayama et al. | |
| 6,323,483 B1 | 11/2001 | Cleveland et al. | |
| 6,337,484 B1 | 1/2002 | Loopstra et al. | |
| 7,110,121 B2 * | 9/2006 | Tsai ............ | 356/498 |
| 7,232,688 B2 | 6/2007 | Little et al. | |
| 7,278,298 B2 | 10/2007 | Hansma et al. | |
| 7,589,823 B2 | 9/2009 | Shibazaki | |
| 7,784,107 B2 | 8/2010 | Kley | |
| 7,791,796 B2 | 9/2010 | Ue et al. | |
| 7,884,326 B2 | 2/2011 | van de Water et al. | |
| 2008/0121813 A1 | 5/2008 | Young | |

* cited by examiner

*Primary Examiner* — Tarifur Chowdhury
*Assistant Examiner* — Jonathan Hansen
(74) *Attorney, Agent, or Firm* — Young Basile Hanlon & MacFarlane PC

(57) ABSTRACT

We disclose a method for accurate three-dimensional position measurement in the field of nano-positioning using a single light beam and principles of interferometry to measure position.

9 Claims, 4 Drawing Sheets

OPTICAL METHOD FOR PRECISE THREE-DIMENSIONAL POSITION MEASUREMENT

CROSS-REFERENCE TO RELATED APPLICATION

This application is a divisional of the co-pending U.S. patent application Ser. No. 12/264,268 filed Nov. 4, 2008 and claims priority thereto, and incorporates the entire disclosure thereby by reference.

FIELD OF THE INVENTION

This invention relates to the field of high-precision positioning and more particularly to the field of accurate and fast position-encoding by principles of light interference and position-sensing light detectors.

BACKGROUND OF THE INVENTION

High-precision positioners are an enabling component of many scientific and industrial instruments. Such instruments are widely used in a variety of fields, for example, in optical microscopy and spectroscopy, electron microscopy, scanning probe microscopy, nanotechnology, wafer inspection, micro assembly, optical fiber alignment methods in optoelectronics, and many others. To be able to move objects with nano-scale accuracy, one needs to measure the position of an object with even more precision. Dimensional position encoders are known; for three-dimensional position encoding, one such encoder is needed for each degree of motion.

U.S. Pat. No. 6,130,427 to Park et al. disclose an optical setup for measuring xyz coordinates of a movable cartridge carrying a scanning microscope probe. The cartridge is affixed to the top of a piezoelectric tube having multiple electrodes. Application of appropriate voltages across the electrodes produces displacement in the plane of the top surface (xy) and along the axis of the tube (z). In this prior art, displacements x and y of the cartridge are measured by the spot where a probing beam of light impinges on a 4-quadrant photodetector positioned in the xy plane. Axial displacement z is measured separately requiring two additional bi-cell photodetectors positioned along a z axis, and two additional probing beams of light. The resulting setup is quite complex and difficult to manufacture, as it requires a complicated alignment.

SUMMARY OF THE INVENTION

We have invented a method for optical position readout in which a single incident beam of light provides position readout in three dimensions in all disclosed embodiments. This method provides a clear advantage over the prior art use of three beams and three detectors.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
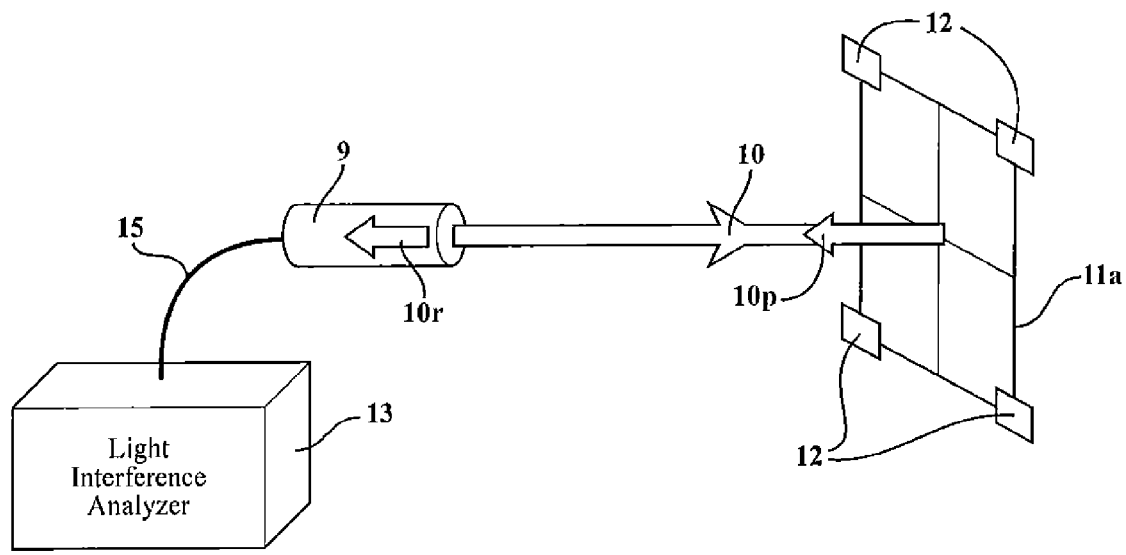
FIG. 1 is a schematic representations of three-axis position-sensing apparatus that measures the electric output of a quadrant photo detector to determine coordinates in the plane of the photo detector, and measures beam interference signal to determine the out-of-plane coordinate.

A preferred apparatus for carrying out the disclosed method is represented by FIG. 1. In this embodiment, one beam of light is required, preferably laser light, to probe all coordinates in three-dimensional space. Turning to the representation in FIG. 1, a beam of light 10 is emanating from the collimating lens 9 which is coupled to an optical fiber 15, at a direction normal to the surface of a quadrant (4-cell) position-sensitive light detector 11a having electrodes 12 at the corners. The collimating lens 9 is preferably a gradient refractive index lens or another collimating optical element or a plurality thereof. A reference beam 10r resulting from the reflection of beam 10 by the inside surface of the collimating lens, or by a separate element with a semi-reflecting surface, is directed to the analyzer 13 by fiber 15. Probing beam 10p results from the reflection of beam 10 by the surface of the detector 11a and is thus directed to reenter the fiber 15 and to interfere with the reference beam 10r. Hence, partially reflective surface of the quadrant light detector 11a plays the role of a sensing arm, while the partially reflective surface of the collimating lens 9 plays the role of a reference arm of the interferometric part of this apparatus. The intensity of interfering beams 10r and 1op depends on phase accumulation caused by displacement of the detector 11a with respect to the fiber end; hence the position of the photo detector 11a along the axis of the fiber end can be inferred by the analyzer 13. The center of a photo detector with respect to x,y position of the light spot formed on the surface of the detector by the incoming beam 10 can be inferred from its electrical signals at electrodes 12. This method allows one to measure motion of light detector with respect to collimating optical element.

Figure 2:
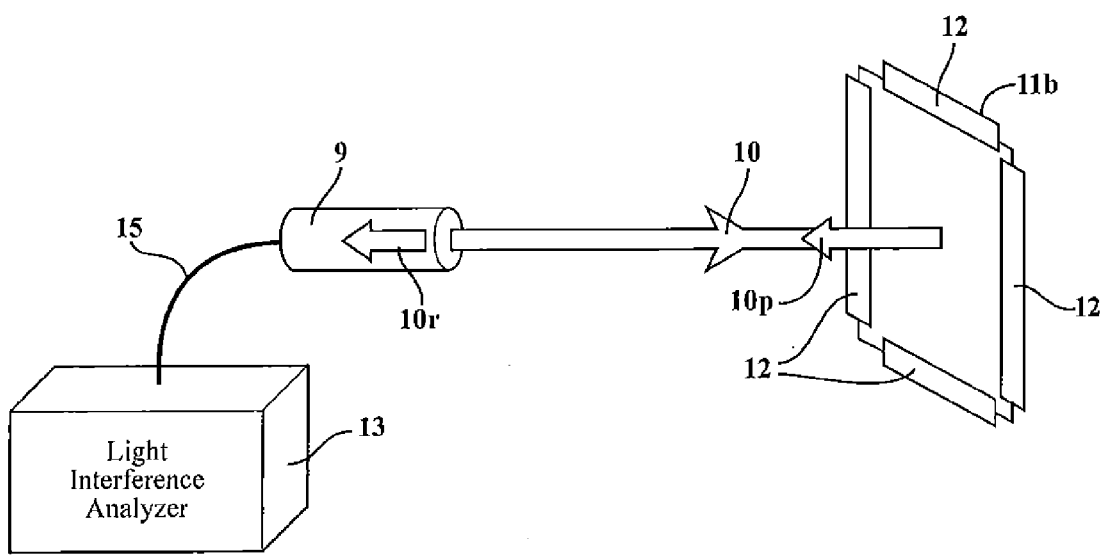
FIG. 2 is a schematic representations of three-axis position-sensing apparatus that measures the electric output of a position-sensing photo detector to determine coordinates in the plane of the photo detector, and measures beam interference signal to determine the out-of-plane coordinate.

Another embodiment is represented in FIG. 2. In this embodiment, the position-sensitive photo detector is a continuous rectangular light detector 11b, operating on the basis of current spreading. The photocurrent generated by the incoming beam 10 spreads to electrodes 12 along resistive paths defined by the location of the spot where beam 10 impinges on the detector 11b, thus relating voltage outputs at electrodes 12 of the detector to its x,y position with respect to the fiber end.

A disclosed method for position readout and control comprises a probing beam of light 10, a position-sensing detector 11a, and an interference analyzer 13. This enables determination of all 3 coordinates of the photo-detector 11a with respect to the fiber end.

Figure 3:
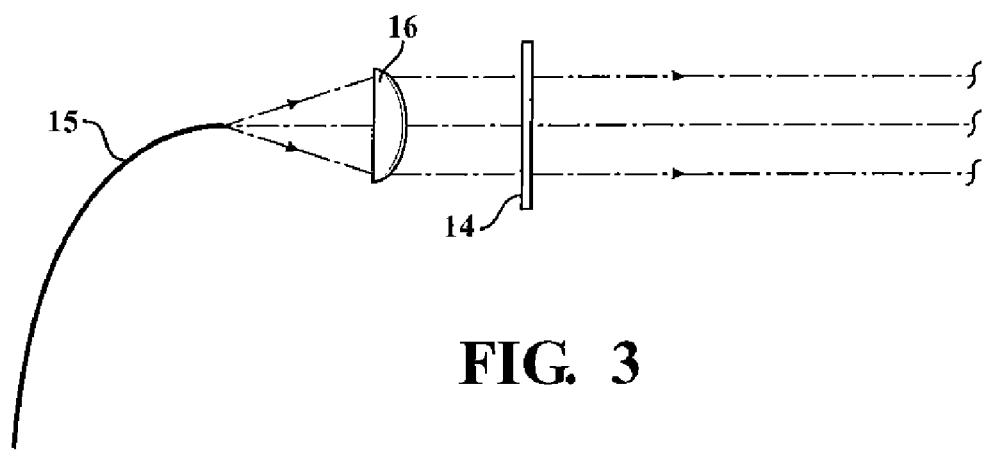
FIG. 3 is an alternative embodiment of a beam-collimating lens and a semi-reflecting planar mirror.
Figure 4:
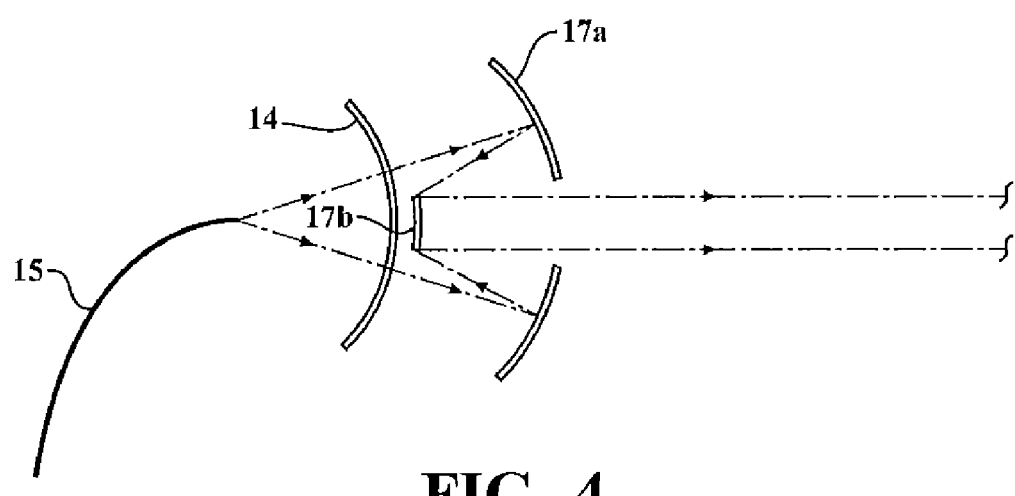
FIG. 4 is an alternative embodiment of a beam-collimating plurality of curved mirrors and a semi-reflecting curved mirror.

Alternative embodiments for creating a probing beam and a reference beam are shown in FIGS. 3 and 4. In FIG. 3, a conventional lens 16 is used for beam collimation and a separate planar element with a semi-reflective surface 14 is introduced to create a reference beam reentering the fiber 15. In FIG. 4, a spherical mirror with a semi-reflective surface 14 is introduced to reflect diverging light emanating from a fiber end back into the fiber, thus creating a reference beam, while the collimation of light emanating from a fiber end is achieved by two curved mirrors 17a and 17b as shown schematically in FIG. 4. These alternative versions require precise alignment.

The advantages of the disclosed method illustrated in FIGS. 1 and 2 with respect to the existing position-sensing instruments are many. The number of components comprising the position-measuring apparatus is minimal: a single source of collimated light is required for positional readout and control in all three dimensions; a single position-sensitive photodetector for reading x and y coordinates also serves as a sensing arm of a fiber interferometer for reading z.

Figure 5:
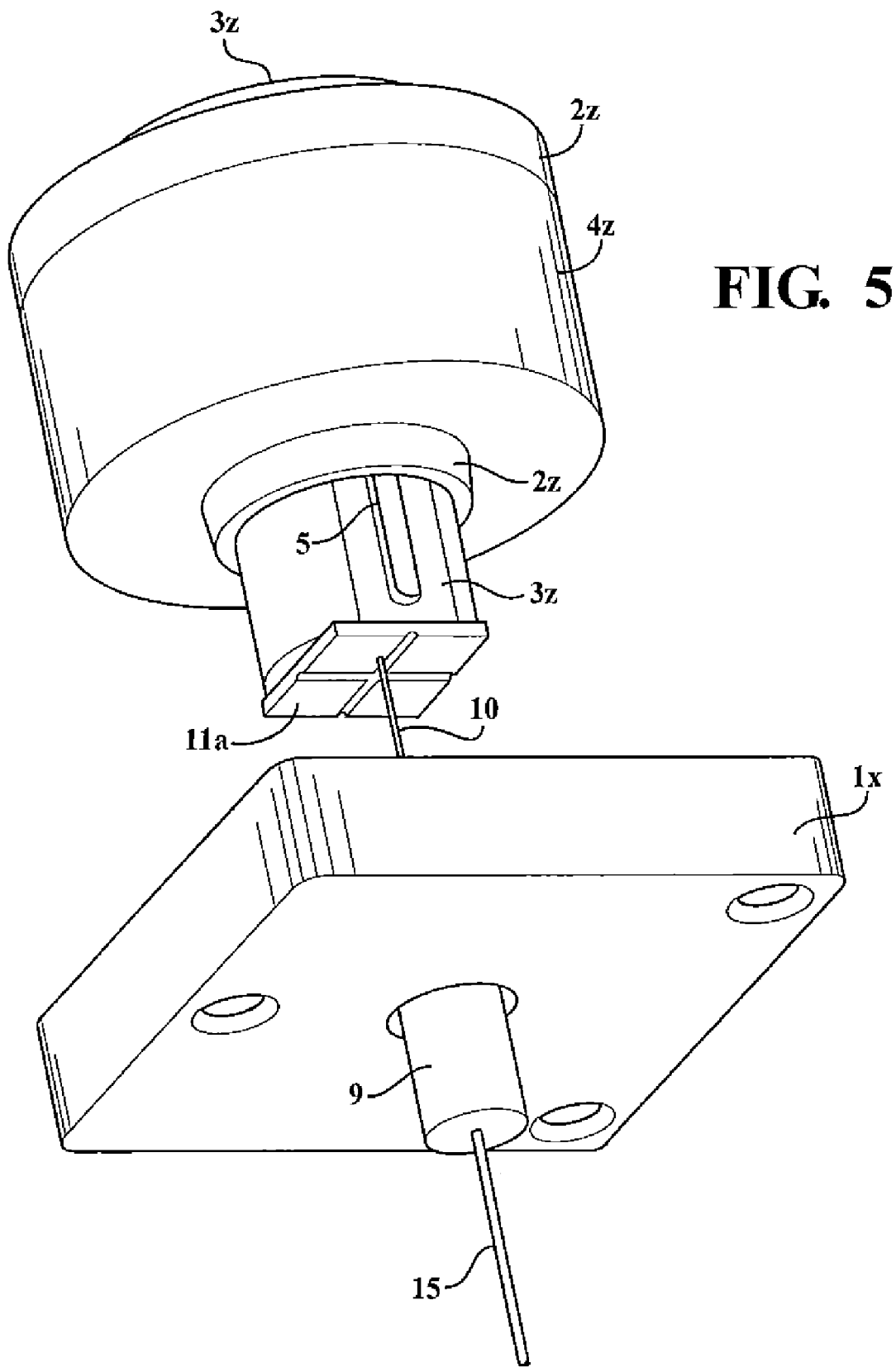
FIG. 5 is an interferometric instrument for measuring coordinates of a platform of the last positioner in a stack of positioners with respect to the base of the first positioner in the stack.
Figure 6:
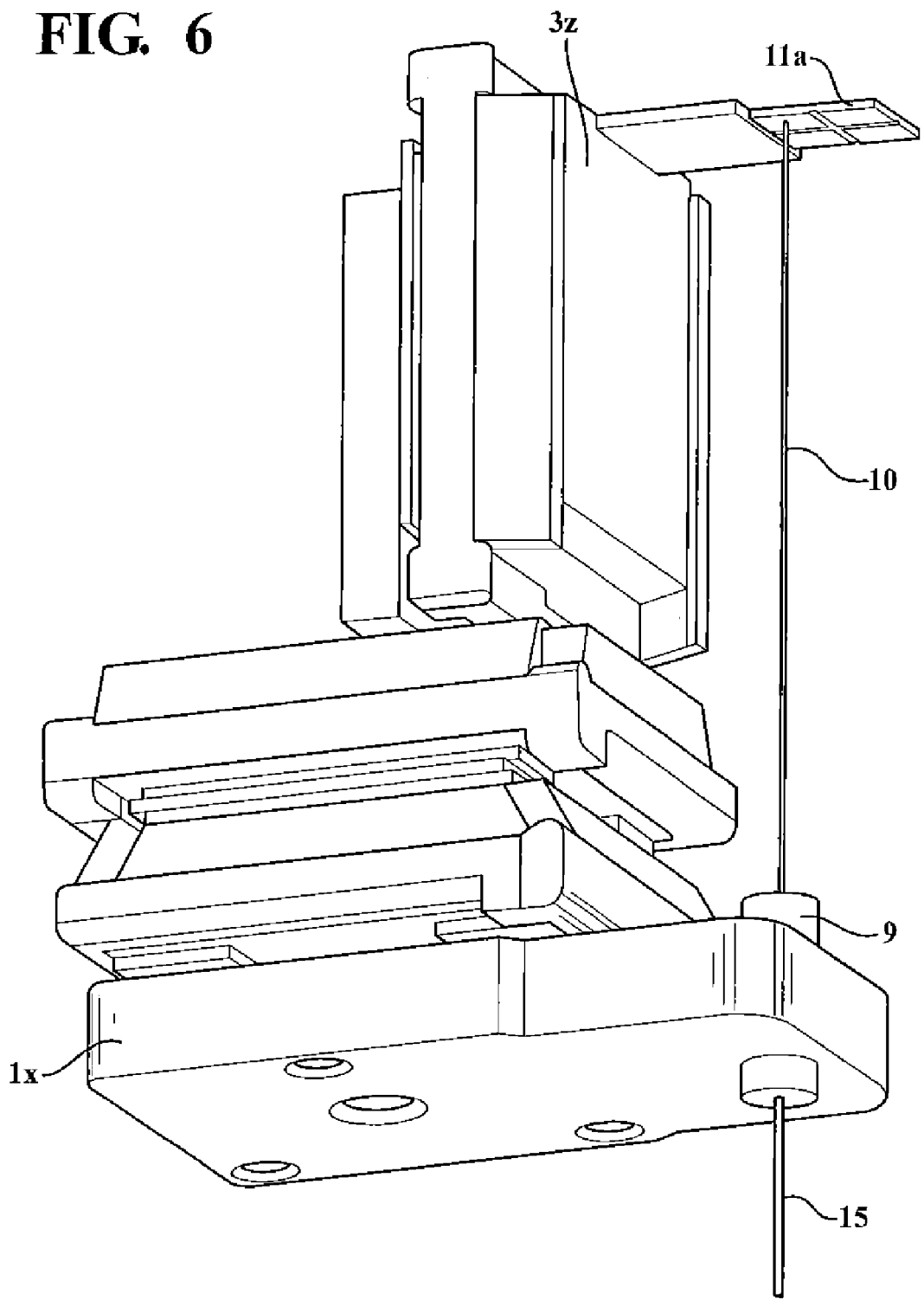
FIG. 6 shows another interferometric instrument for measuring the coordinates of the platform of the last positioner in a stack of positioners with respect to the base of the first positioner in a stack of positioners.

Furthermore, integration of such instrument with a positioner is straight forward, as illustrated by graphical projections in FIG. 5 and FIG. 6. An integrated instrument is a stack of single-axis positioners; and an interferometric/position-sensitive module for coordinate readout and control disclosed above. The x and y positioners are omitted in FIG. 5 for clarity of representation of the position-measuring apparatus. A collimating lens 9 is affixed to the base 1x of the first positioner in the stack, while the position-sensitive photodetector 11a is disposed at the right angles with respect to the direction of the probing beam 10 and is affixed to the platform 3z of the last positioner in the stack. Thus, the optical module is reading the position of the platform 3z with respect to the base 1x. A preferred embodiment represented in FIG. 5 is characterized by compactness and small footprint, in part due to enclosing an optical module for determining coordinates within a 3-axis positioner. The embodiment of FIG. 5 is based on the embodiment of FIG. 5 in the aforementioned parent application whereas the embodiment of FIG. 6 is based on the arrangement of FIG. 6 from the parent application.

What is claimed is:

1. A method of measuring three orthogonal coordinates of an object restricted in space to be movable without rotation by a single beam of light comprising:
   providing an interferometer comprising a sensing arm and a probing beam;
   affixing a position-sensing photodetector to said object;
   using said photodetector as a sensing arm of said interferometer, wherein said probing beam is reflected by a surface of the photodetector;
   measuring one of said coordinates interferometrically; and
   measuring the remaining said coordinates by measuring electrical signals generated by said photodetector and converting measured signals into coordinates using calculations.

2. The method of claim 1 wherein said interferometer is a fiber interferometer, further comprising a lens for collimating light emanating from said fiber interferometer and directing said light onto said photodetector.

3. The method of claim 1 further comprising providing the accuracy of determination of coordinates of said object in plane of said photodetector between 0.1 nm and 10 nm for said coordinates disposed within 100 μm from the center of said photodetector.

4. The method of claim 1 further comprising providing the accuracy of determination of coordinates of said object in plane of said photodetector between 10 nm and 100 nm for said coordinates disposed within 10 mm from the center of said photodetector.

5. The method of claim 1 wherein said lens is a gradient refractive index lens.

6. The method of claim 1 wherein said position-sensing photodetector is a quadrant photodetector.

7. The method of claim 1 wherein said position-sensing photodetector is a continuous position-sensing light detector operating on the principle of current spreading.

8. The method of claim 2 wherein the lens creating a collimated light is attached to the base of a first translational positioner in a stack of positioners each having a base and a platform movable on its base without rotation, each next positioner has its base connected to or coincident with the moving platform of the previous positioner and the last moving platform having a position-sensing photodetector attached to it.

9. A method of determining the coordinates of an object in space along mutually orthogonal x, y and z axes wherein the object is restricted against rotational motion comprising the steps of:
   attaching a position-sensitive photodetector to said object wherein said photodetector has a photodetecting surface parallel to the x-y plane;
   aiming an interferometric source of coherent light at the photodetector along the z axis; and measuring the coordinates of the object along three axes, wherein the measurement of the z axis is made interferometrically by reflecting a probing beam from a surface of the photodetector, while the x and y axes are determined by processing signals from the position-sensitive photodetector.

* * * * *